(12) United States Patent
Kurasawa

(10) Patent No.: US 7,405,253 B2
(45) Date of Patent: Jul. 29, 2008

(54) REINFORCED THERMOPLASTIC RESIN COMPOSITION AND MOLDED PRODUCTS THEREOF

(75) Inventor: Yoshihiro Kurasawa, Minato-ku (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 458 days.

(21) Appl. No.: 11/015,446

(22) Filed: Dec. 16, 2004

(65) Prior Publication Data

US 2005/0182166 A1 Aug. 18, 2005

(30) Foreign Application Priority Data

Dec. 24, 2003 (JP) ............................. 2003-427965

(51) Int. Cl.
*C08K 3/34* (2006.01)
(52) U.S. Cl. ................. 524/456; 524/127; 524/140; 524/141; 524/449; 524/451; 264/109; 264/110
(58) Field of Classification Search ................ 524/127, 524/140, 449, 451, 456, 141; 264/109–110
See application file for complete search history.

(56) References Cited

U.S. PATENT DOCUMENTS

| 4,612,344 | A | * | 9/1986 | Breitenfellner | ............. | 524/601 |
| 5,623,013 | A | * | 4/1997 | Tanaka et al. | ............... | 524/443 |
| 5,637,643 | A | | 6/1997 | Umeda et al. | | |
| 6,924,334 | B1 | * | 8/2005 | Fukatani et al. | ............. | 524/445 |
| 2006/0079614 | A1 | | 4/2006 | Kikuchi | | |
| 2006/0118987 | A1 | * | 6/2006 | Yukihira et al. | ............... | 264/71 |

FOREIGN PATENT DOCUMENTS

| JP | 6-172611 | 6/1994 |
| JP | 8-73728 | 3/1996 |
| JP | 8-176339 | 7/1996 |
| JP | 2000-230124 | 8/2000 |
| JP | 2002-265769 | 9/2002 |
| WO | WO 03/080728 A1 | 10/2003 |

* cited by examiner

*Primary Examiner*—Peter Szekely
(74) *Attorney, Agent, or Firm*—Edwards Angell Palmer & Dodge LLP; David G. Conlin; Mark D. Rusett

(57) ABSTRACT

The present invention relates to a reinforced thermoplastic resin composition comprising at least an amorphous thermoplastic resin (A), a flame retardant (B), fibrous calcium silicate (C) and an inorganic material (D) comprising talc and/or mica, the content of flame retardant (B) being 0.01 to 30 parts by weight based on 100 parts by weight of the amorphous thermoplastic resin (A);

the content of fibrous calcium silicate (C) in said composition being 3 to 30% by weight, and the content of the inorganic material (D) comprising talc, mica or mixture thereof in said composition being 3 to 30% by weight.

1 Claim, No Drawings

REINFORCED THERMOPLASTIC RESIN COMPOSITION AND MOLDED PRODUCTS THEREOF

PRIORITY CLAIM

The priority application No. 2003-427965 filed on Dec. 24, 2003 upon which this application is based is hereby incorporated by reference.

BACKGROUND OF THE INVENTION

The present invention relates to a reinforced thermoplastic resin composition and the molded products thereof. More particularly, it relates to a reinforced thermoplastic resin composition which can minimize abrasion of the screws and inner walls of cylinders of the melt kneader and the gate and cavity of the mold in the process of production of the composition and molding, and which causes little warpage of the molded products and also excels in rigidity, strength, self-tapping properties, flame retardancy, etc., and the molded products of the said resin composition.

Amorphous reinforced resins are widely used in the various fields of industry because of their high degree of design freedom and excellent productivity, and many methods for incorporating fibrous inorganic reinforcements, plate-shaped or particulate inorganic fillers or such in the resin compositions for further improvement of strength or rigidity have been proposed. For instance, Japanese Patent Application Laid-Open (KOKAI) No. 6-172611 discloses a glass-reinforced flame-retardant polycarbonate resin composition produced by incorporating a flame retardant and glass fibers, glass flakes or glass beads in a resin composition comprising a polycarbonate resin and an ABS resin. However, the glass fibers, glass flakes and glass beads incorporated in the composition described in the above patent are all high in hardness and therefore cause excessive abrasion of the cylinder inner walls and screws of the extruder or molder and the gate and cavity of the mold in the process of production and molding of the resin compositions, so that it has been difficult to produce with stability a high-quality glass-reinforced flame-retardant polycarbonate resin composition and the molded products of such a resin composition.

Japanese Patent Application Laid-Open (KOKAI) No. 8-127711 discloses a resin composition comprising a polycarbonate resin, an aromatic polyester resin, an elastomeric material, surface-treated talc and/or surface-treated mica, and Japanese Patent Application Laid-Open (KOKAI) No. 8-176339 discloses a resin composition produced by blending talc having a bulk specific gravity of 0.4 to 0.9 in a thermoplastic resin such as polycarbonates. Any of the resin compositions disclosed in these patents is indeed improved in rigidity and warpage in its own way and can lessen abrasion of the screws and cylinders of the melt kneader and molder and the gate and cavity of the mold, but these resin compositions are unsuited for the production of the molded articles which require clamping by self-tapping screws, because these resin compositions can not provide enough self-tapping strength, and thus there were of poor practical applicability.

In Japanese Patent Application Laid-Open (KOKAI) No. 8-073728 discloses a resin composition produced by blending a fibrous inorganic filler such as wollastonite (fibrous calcium silicate) in a polycarbonate resin or a mixture thereof with other thermoplastic resin. Japanese Patent Application Laid-Open (KOKAI) No. 2000-230124 discloses a thermoplastic resin composition comprising a mixture of a thermoplastic resin such as polycarbonates and fibrous β-wollastonite which has been surface-treated with a phosphoric ester compound. Further, Japanese Patent Application Laid-Open (KOKAI) No. 2002-265769 discloses a resin composition obtained by blending wollastonite of a specific particle shape in a resin base comprising a polycarbonate resin or such. The resin compositions disclosed in these patents, however, can provide only those molded products which, although improved in rigidity and self-tapping strength, have high anisotropism and a large warpage because of incorporation of fibrous wollastonite.

SUMMARY OF THE INVENTION

The object of the present invention is to provide a reinforced thermoplastic resin composition which can lessen abrasion of the cylinder inner walls, screws, etc., of the melt kneader and molder and the gate and cavity of the mold in the process of production and molding of the resin composition, and which causes little warpage of the molded products and also excels in rigidity, strength, self-tapping properties, flame retardancy, etc., and the molded products obtained from the said resin composition.

As a result of the present inventors' earnest studies on the subject matter, it has been found that it is possible to realize both reduced warpage of the molded products and improvement of self-tapping strength at the same time by containing specified amounts of a flame retardant, fibrous calcium silicate, talc, mica or mixture thereof in an amorphous thermoplastic resin, and consequently to obtain a thermoplastic resin composition which excels in all of the said points and has a good balance of properties, and the molded products comprising this composition.

In the first aspect of the present invention, there is provided a reinforced thermoplastic resin composition comprising at least (A) an amorphous thermoplastic resin, (B) a flame retardant, (C) fibrous calcium silicate, and (D) an inorganic material comprising talc, mica or mixture thereof, the content of the flame retardant (B) in ratio based on 100 parts by weight of the amorphous thermoplastic resin (A) being 0.01 to 30 parts by weight, the content of fibrous calcium silicate (C) in the said composition being 3 to 30% by weight, and the content of the inorganic material (D) comprising talc, mica or mixture thereof in the composition being 3 to 30% by weight.

In the second aspect of the present invention, there are provided the molded products comprising the above reinforced thermoplastic resin composition.

DETAILED DESCRIPTION OF THE INVENTION

A detailed description of the present invention is given below.

As the amorphous thermoplastic resin (A) used in the present invention, for example, polycarbonate resins, polyphenylene ether resins, polystyrene resins, polysulfone resins, polyethersulfone resins, polyetherimide resins, polyallylates and PMMA can be mentioned. Of these resins, polycarbonate resins, polyphenylene ether resins and polystyrene resins are preferred, polycarbonate resins and polyphenylene ether resins being especially preferred in view of having a good balance of heat resistance, flame retardancy and moldability.

"Polycarbonate resin" referred to in the present invention is a mixture of 50 to 100% by weight of a polycarbonate resin and 50 to 0% by weight of other thermoplastic resin. 100% by weight of polycarbonate resin is also possible. As other thermoplastic resin used in combination with a polycarbonate resin, AS resins, ABS resins, polyethylene terephthalate, polybutyrene terephthalate, etc., are usable, of which AS resins and ABS resins are preferred. The content of other thermoplastic resin in ratio based on 100% by weight of polycarbonate resin is preferably not more than 50% by weight, more preferably not more than 40% by weight. When its content exceeds 50% by weight, deflection temperature under load of the composition may lower. In terms of heat resistance and flame retardancy, it is preferable that the content of other thermoplastic resin be minimized, but a higher content of other thermoplastic resin is preferred for better fluidity of the composition. Considering these conflicting factors, the upper limit of the content of other thermoplastic resin is especially preferably 10% by weight while its lower limit is usually 30% by weight.

The polycarbonate resin used in the present invention may be selected from aromatic polycarbonate resins, aliphatic polycarbonate resins and aromatic-aliphatic polycarbonate resins, but aromatic polycarbonate resins are preferred in view of heat resistance and flame retardancy. Exemplary of such aromatic polycarbonate resins are the thermoplastic aromatic polycarbonate polymers or copolymers, including the branched ones, made by reacting aromatic hydroxyl compounds or these compounds and a small quantity of polyhydroxyl compounds with phosgene or carbonic diesters.

As the said aromatic dihydroxyl compound, 2,2-bis(4-hydroxyphenyl)propane (=bisphenol A), tetramethylbisphenol A, bis(4-hydroxyphenyl)-p-diisopropylbenzene, hydroquinone, resorcinol, 4,4'-dihydroxybiphenyl and such can be used, with bisphenol A being preferred. In order to further enhance flame retardancy, it is possible to use the compounds having one or more tetraalkylphosphonium sulfonates attached to the said aromatic dihydroxyl compounds, and/or the polymers or oligomers having a siloxane structure and containing phenolic OH groups at both ends of the molecular chain.

For obtaining a branched aromatic polycarbonate resin, a polyhydroxyl compound such as phloroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl)benzene, ot 1,1,1-tri(4-hydroxyphenyl)ethane, etc., or 3,3-bis(4-hydroxyaryl)oxyindole (=isatinbisphenol), 5-chloroisatinbishphenol, 5,7-dicycloisatinbisphenol, 5-bromoisatinbisphenol or the like is used as a part of the said aromatic dihydoxyl compound. This additive compound is used in an amount of usually not less than 0.01 mol %, preferably not less than 0.1 mol %, but usually not more than 10 mol %, preferably not more than 2 mol % in the aromatic dihydroxyl compound.

An aromatic monohydroxyl compound is used for adjusting the molecular weight. Exemplary of such an aromatic monohydroxyl compound are m-methylphenol, p-methylphenol, m-propylphenol, p-propylphenol, p-tert-butylphenol, and p-long-chain alkyl-substituted phenol.

Particularly preferred for use as the polycarbonate resin in the present invention are the polycarbonate polymers derived from 2,2-bis(4-hydroxyphenyl)propane, and the polycarbonate copolymers derived from 2,2-bis(4-hydroxyphenyl)propane and other aromatic dihydroxyl compounds.

In case where the amorphous thermoplastic resin (A) used in the present invention is a polycarbonate resin, this polycarbonate resin may comprise two or more types of polycarbonate resin.

The molecular weight of the said polycarbonate resin, determined as viscosity-average molecular weight from the solution viscosity measured at 25° C. using methylene chloride as solvent, is usually not less than 14,000, preferably not less than 15,000, more preferably not less than 16,000, but usually not more than 30,000, preferably not more than 28,000, more preferably not more than 26,000. When the viscosity-average molecular weight of the polycarbonate resin is less than 14,000, the composition may not be provided with satisfactory mechanical strength, while when the above viscosity exceeds 30,000, the composition tends to have a problem in moldability.

The preparation method of the polycarbonate resin is not specifically defined; it is possible to produce the resin by, for example, phosgene method (interfacial polymerization method) or melting method (ester exchange method). It is also possible to use an aromatic polycarbonate resin produced by the melting method and adjusted in the amount of its terminal OH groups.

The polyphenylene ether resin used in the present invention comprises 30 to 100% by weight of a polyphenylene ether resin and 70 to 0% by weight of other thermoplastic resin. A polyphenylene ether resin may be used alone. As other thermoplastic resin used in combination with a polyphenylene ether resin, polystyrene resins are preferred in terms of compatibility with polyphenylene ether resins. When the ratio of other resin exceeds 70% by weight based on 100% by weight of polyphenylene ether resin, the composition may be reduced in deflection temperature under load. The content of other resin is more preferably not more than 50% by weight, with its lower limit being preferably around 10% by weight.

The polyphenylene ether resin used in the present invention is usually a homopolymer or a copolymer having a structure (repeating unit) represented by the following formula (1):

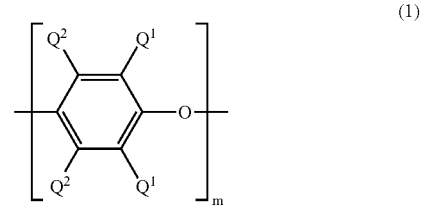

wherein $Q^1$s represent independently a halogen atom, a primary or secondary alkyl group, an aryl group, an aminoalkyl group, an alkoxyl group or a haloalkoxyl group; $Q^2$s represent independently a hydrogen atom, a halogen atom, a primary or secondary alkyl group, an aryl group, a haloalkyl group, an alkoxyl group or a haloalkoxyl group; and m is an integer of 10 or more.

In the above formula (1), when $Q^1$ is a halogen atom, it is preferably chlorine atom or bromine atom.

When $Q^1$ is a primary alkyl group, it is preferably an alkyl group having 1 to 10 carbon atoms such as methyl, ethyl, n-propyl, n-butyl, n-amyl, isoamyl, 2-methylbutyl, n-hexyl, 2,3-dimethylbutyl, 2-, 3- or 4-methylpentyl or heptyl.

When $Q^1$ is a secondary alkyl group, it is preferably an alkyl group having 4 to 10 carbon atoms such as isopropyl, sec-butyl or 1-ethylpropyl.

When $Q^1$ is an aryl group, its preferred example is phenyl, and when it is an aminoalkyl group, it is preferably the one having an alkyl chain with about 1 to 5 carbon atoms, such as dimethylamino, diethylamino and dibutylamino.

When $Q^1$ is an alkoxyl group, it is preferably selected from those corresponding to the groups cited above as preferred examples of alkyl group. When $Q^1$ is a haloalkoxyl group, examples thereof are those of the said alkoxyl groups in which one or more of the hydrogen atoms are substituted with a halogen atom.

In the above formula (1), $Q^2$s represent independently a hydrogen atom, a halogen atom, a primary or secondary alkyl group, an aryl group, a haloalkyl group, an alkoxyl group or a haloalkoxyl group. When $Q^2$ is a halogen atom, a primary or secondary alkyl group, an aryl group, an alkoxyl group or a haloalkoxyl group, the preferred examples thereof are the same groups as mentioned above with relation to $Q^1$. When $Q^2$ is a haloalkyl group, its preferred examples are those of the groups mentioned above as preferred examples of alkyl group in which one or more hydrogen atoms are substituted with a halogen atom.

In the above formula (1), $Q^1$ is preferably an alkyl group or a phenyl group, especially an alkyl group having 1 to 4 carbon atoms. $Q^2$ is especially preferably a hydrogen atom.

Preferred examples of the polyphenylene ether resin homopolymers are those comprising the repeating units derived from 2,6-dimethyl-1,4-phenylene ether (satisfying the specifications of the above formula (1)). Preferred examples of the copolymers are the random copolymers comprising a combination of the said repeating units and those derived from 2,3,6-trimethyl-1,4-phenylene ether (satisfying the specifications of the above formula (1)).

For adjusting the molecular weight or improving the various properties such as melt viscosity and/or impact strength within limits not affecting the normal performance of the present invention, it is also preferable to use polyphenylene ethers having a repeating structure other than the one represented by the above formula (1).

The polyphenylene ether resin used in the present invention is preferably the one whose intrinsic viscosity measured in chloroform at 30° C. is 0.2 to 0.8 dl/g, more preferably 0.2 to 0.7 dl/g, especially 0.25 to 0.6 dl/g. When the intrinsic viscosity of the resin is less than 0.2 dl/g, the produced composition may prove poor in impact resistance, and when the viscosity is over 0.8 dl/g, moldability of the composition may be found unsatisfactory.

The polystyrene resins usable as amorphous thermoplastic resin (A) in the present invention are the polymers or copolymers containing not less than 50% by weight of the repeating units derived from the aromatic vinyl compounds, or the rubber-modified version of these polymers or copolymers.

Examples of the said aromatic vinyl compounds are styrenes; α-alkyl-substituted styrenes such as α-methylstyrene; and nuclear alkyl-substituted styrenes such as p-methylstyrene, o-ethylstyrene, vinyltoluene and o-p-dichlorostyrene.

As the monomers other than the aromatic vinyl compounds, the following can be mentioned: vinyl cyanate compounds such as acrylonitrile, methacrylonitrile and ethacrylonitrile; (meth)acrylic ester compounds such as methyl, ethyl, propyl, n-butyl, and n-hexyl, etc. of acrylic and methacrylic acids; maleimide and maleimide compounds such as N-methylmaleimide, N-cyclohexylmaleimide and N-phenylmaleimide; acrylamide and acrylamide compounds such as N-methylacrylamide; unsaturated acid anhydrides such as maleic anhydride and itaconic anhydride; unsaturated acids such as acrylic acid and methacrylic acid; and various other vinyl compounds such as glycidyl acrylate, glycidyl methacrylate, 2-hydroxyethyl acrylate, 2-hydroxyethyl methacrylate and methoxypolyethylene glycol methacrylate. Typical examples of the said polystyrene resins are polystyrene, AS (acrylonitrile-styrene) resin and MS (methyl methacrylate-styrene) copolymer.

The weight-average molecular weight of these polystyrene resins (the above-mentioned polymers) is usually not less than 50,000, preferably not less than 100,000, more preferably not less than 150,000, but usually not more than 500,000, preferably not more than 400,000, more preferably not more than 300,000.

The polystyrene resins used in the present invention may be the rubber-modified version of the said polymers. As rubber for modification, polybutadiene, styrene-butadiene copolymer, polyisoprene, ethylene-propylene copolymer and the like, can be used. Examples of the rubber-modified version of the said polymers are high impact polystyrenes, ABS resins, MBS resins, or AES resins, etc.

The ABS resins in the present invention include, beside styrene-butadiene-acrylonitrile copolymer (ABS resin), those of the ABS resins in which the rubber moiety mainly comprised of butadiene is substituted with other type of rubber such as ethylene-propylene rubber and acrylic rubber, etc. as well as those in which styrene and/or acrylonitrile are substituted with other monomers.

Especially preferred as polystyrene resin in the present invention are polystyrenes, rubber-modified version of the polystyrene resins and mixtures thereof.

The flame retardant (B) used in the present invention is not specifically defined; it is possible to use the ones known in the art, preferably phosphoric ester compounds, organosulfonic acid metal salts and silicone compounds. Phosphoric ester compounds are particularly preferred in view of improvement of fluidity.

The phosphoric ester compounds usable in the present invention include, for example, those represented by the following formula (2):

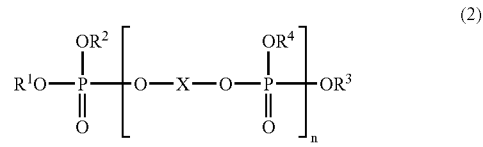

(2)

wherein $R^1$, $R^2$, $R^3$ and $R^4$ represent independently an aryl group which may be substituted; X represents an arylene group which may be substituted; and n is an integer of 0 to 5.

As the aryl group represented by $R^1$ to $R^4$ in the above formula (2), phenyl group and naphthyl group can be mentioned as examples. The arylene groups represented by X include phenylene group, naphthylene group, and the divalent groups derived from the bisphenol compounds. The substituent groups that these aromatic rings can possess include alkyl groups having about 1 to 8 carbon atoms, alkoxyl groups having about 1 to 8 carbon atoms, and hydroxyl groups. The compound represented by the above formula (2) is a phosphoric ester when n is 0, and a condensed phosphoric ester (a mixture) when n is 1 or more.

The condensed phospholic ester compounds (n is 1 or more) are preferably used in the present invention. Exemplary of the compounds represented by the above formula (2) are bisphenol A bisphosphate, hydroquinone bisphosphate, resorcinol bisphosphate, and their substituents or condensates.

The commercially available condensed phosphoric ester compounds are under the trade names of, for example, "CR733S" (resorcinol bis(diphenylphosphate)) and "CR741" (bisphenol A bis(diphenylphosphate)), both being supplied from Daihachi Chemical Industry Co., Ltd., and "FP500" (resorcinol bis(dixylenylphosphate)) supplied from Asahi Denka Co., Ltd.

In the present invention, the content of the phosphoric ester compound used as flame retardant (B) is usually not less than one part by weight, preferably not less than 3 parts by weight, more preferably not less than 5 parts by weight, but usually not more than 30 parts by weight, preferably not more than 25 parts by weight, more preferably not more than 20 parts by weight, based on 100 parts by weight of the amorphous thermoplastic resin (A). When the content of the phosphoric ester compound is below the lower limit value, flame retardancy of the composition may fall short of being satisfactory, and when the content exceeds the upper limit value, heat resistance may deteriorate.

The organosulfonic acid metal salts used in the present invention may be either aliphatic or aromatic. Alkaline or alkaline earth metals are preferably used as the metal moiety of the organosulfonic acid metal salts. Examples of such metals are sodium, lithium, potassium, rubidium, cesium, beryllium, magnesium, calcium, strontium and barium, of which sodium and potassium are preferred in view of flame retardancy. Two or more of the organosulfonic acid metal salts may be used in combination.

The aliphatic sulfonates used in the present invention are preferably fluoroalkane-sulfonic acid metal salts, more preferably perfluoroalkane-sulfonic acid metal salts. Preferred examples of the fluoroalkane-sulfonic acid metal salts are alkaline metal salts and alkaline earth metal salts of fluoroalkane-sulfonic acid. More preferred are alkaline metal salts and alkaline earth metal salts of fluoroalkane-sulfonic acid with a carbon number of 4 to 8

Examples of the fluoroalkane-sulfonates include sodium perfluorobutane-sulfonate, potassium perfluorobutane-sulfonate, sodium perfluoromethylbutane-sulfonate, potassium perfluoromethylbutane-sulfonate, sodium perfluorooctane-sulfonate, potassium perfluorooctane-sulfonate, and tetraethylammonium salt of perfluorobutane-sulfonic acid.

As preferred examples of the aromatic sulfonic acid metal salts usable in the present invention, aromatic sulfonic acid alkaline metal salts, aromatic sulfonic acid alkaline earth metal salts, aromatic sulfonesulfonic acid alkaline metal salts, and aromatic sulfonesulfonic acid alkaline earth metal salts can be mentioned. The aromatic sulfonesulfonic acid alkaline metal salts and aromatic sulfonesulfonic acid alkaline earth metal salts may be polymers.

Examples of the aromatic sulfonic acid metal salts are sodium 3,4-dichlorobenzenesulfonate, sodium 2,4,5-trichlorobenzenesulfonate, sodium benzenesulfonate, sodium salt of diphenylsulfone-3-sulfonic acid, potassium salt of diphenylsulfone-3-sulfonic acid, sodium salt of 4,4'-dibromodiphenyl-sulfone-3-sulfonic acid, potassium salt of 4,4'-dibromodiphenyl-sulfone-3-sulfonic acid, potassium salt of 4-chloro-4'-nitrodiphenylsulfone-3-sulfonic acid, disodium salt of diphenylsulfone-3,3'-disulfonic acid, and dipotassium salt of diphenylsulfone-3,3'-disulfonic acid.

The content of the organosulfonic acid metal salt in the composition of the present invention is usually not less than 0.01 part by weight, preferably not less than 0.02 parts by weight, more preferably not less than 0.03 parts by weight, but usually not more than 30 parts by weight, preferably not more than 5 parts by weight, more preferably not more than 3 parts by weight, especially preferably not more than 2 parts by weight, based on 100 parts by weight of the amorphous thermoplastic resin (A). When the content of the organosulfonic acid metal salt is below the lower limit, the desired level of flame retardancy can hardly be obtained, and when the said content exceeds the upper limit, the composition tends to lose thermal stability.

As the silicone compound used as flame retardant in the present invention, organopolysiloxanes having a linear or branched molecular structure are preferred. The organic group in the said organopolysiloxanes is selected from alkyl groups which may have substituents with a carbon number of 1 to 20, alkenyl groups which may have substituents with a carbon number of around 2 to 20, cycloalkyl groups with a carbon number of around 3 to 20, and aromatic hydrocarbon groups with a carbon number of around 6 to 20 such as phenyl and benzyl groups. Examples of the substituents that the said alkyl and alkenyl groups may have are $C_1$-$C_{20}$ alkyl groups, $C_1$-$C_{20}$ alkoxyl groups and $C_6$-$C_{20}$ aromatic hydrocarbon groups.

Also, polydiorganosiloxanes may have a functional group. Such a functional group is preferably methacryl group, alkoxyl group or epoxy group.

The content of the silicone compound is usually not less than 0.2 parts by weight, preferably not less than 0.3 parts by weight, more preferably not less than 0.4 parts by weight, but usually not more than 30 parts by weight, preferably not more than 5 parts by weight, more preferably not more than 4.5 parts by weight, especially preferably not more than 4.0 parts by weight, based on 100 parts by weight of the amorphous thermoplastic resin (A). When the amount of the silicone compound contained is below the lower limit, the finally obtained reinforced thermoplastic resin composition may prove unsatisfactory in flame retardancy, and when the silicone resin content exceeds the upper limit value, heat resistance of the obtained composition may be too low.

In the present invention, it is possible to use either only one flame retardant or two or more different types of flame retardants at the same time. The total content of the flame retardant(s) is 0.01 to 30 parts by weight, preferably not less than 0.02 parts by weight, more preferably not less than 0.03 parts by weight, but preferably not more than 25 parts by weight, more preferably not more than 20 parts by weight, based on 100 parts by weight of the resin (A). When the flame retardant content is below the lower limit, the obtained composition may be unsatisfactory in flame retardancy, while use of the flame retardant(s) in excess of the upper limit may lead to a reduction of heat resistance and/or thermal stability of the composition.

In the present invention, it is also possible to contain a fluorine resin for the purpose of preventing dripping during combustion.

The "fluorine resin" mentioned above refers to the polymers or copolymer having a fluoroethylene structure, for example, difluoroethylene polymer, tetrafluoroethylene polymer, tetrafluoroethylene-hexafluoropropylene copolymer, and copolymers of tetrafluoroethylene and fluorine-free ethylene monomers. Polytetrafluoroethylene (PTFE) is preferred. The average molecular weight of the fluorine resin used in the present invention is preferably not less than 500,000, more preferably 500,000 to 10,000,000. As polytetrafluoroethylene, it is possible to use any of the polymers commonly used in the art for the same purpose as the composition of the present invention. Even higher melt dripping preventive effect can be obtained by using those of the polytetrafluoroethylenes which have the fibril-forming properties. The polytetrafluoroethylenes having the fibril-forming properties are not specifically defined. Exemplary thereof are those classified under Type 3 in the ASTM standard, which include, for example, such commercial products as Teflon 6-J (Mitsui Du Pont Fluorochemical Co., Ltd.), Polyflon D-1, Polyflon F-103 and Polyflon 201 (Daikin Industries, Ltd.), and CD076 (Asahi ICI Fluoropolymers Co., Ltd.).

Among other examples than those classified under Type 3 mentioned above are Algoflon F5 (Montefluos Co., Ltd.), and Polyflon MPA and Polyflon FA-100 (Daikin Industries, Ltd.). These polytetrafluoroethylenes may be used either alone or as a combination of two or more types. The polytetrafluoroethylenes having the fibril-forming properties can be obtained, for example, by polymerizing tetrafluoroethylenes in an aqueous solvent in the presence of sodium, potassium and ammonium peroxydisulfide under a pressure of 1 to 100 psi at 0 to 200° C., preferably 20 to 100° C.

The polyfluoroethylene content is usually 0.01 to 5 parts by weight based on 100 parts by weight of the amorphous thermoplastic resin (A). When the polyfluoroethylene content is less than 0.01 part by weight, the desired flame-retardancy (dripping preventive effect) may not be obtained, and when the content exceeds 5 parts by weight, the product appearance tends to be impaired. The polyfluoroethylene content is preferably not less than 0.02 parts by weight, more preferably not less than 0.05 parts by weight, but preferably not more than 4 parts by weight, more preferably not more than 3 parts by weight, based on 100 parts by weight of the amorphous thermoplastic resin (A).

Fibrous calcium silicate (C) used in the present invention can be, for instance, wollastonite represented by $CaO.SiO_2$ or xonotlite represented by $6CaO.6SiO_2.H_2O$. Wollastonite is a naturally occurring white acicular crystalline mineral which is fibrous or lump-formed. In the present invention, fibrous wollastonite is preferably used. It is also possible to use a synthetic product. Fibrous wollastonite is varied in aspect ratio depending on the pulverization method and the place of production, but generally β-type wollastonite having a large aspect ratio is preferred because of high reinforcing performance. The initial fiber diameter of wollastonite is, on the average, preferably not less than 2 μm, more preferably not less than 3 μm, especially preferably not less than 4 μm, but preferably not more than 30 μm, more preferably not more than 20 μm, especially preferably not more than 15 μm. When the average fiber diameter is less than 2 μm, the fibers are apt to break during working, and when it exceeds 30 μm, the reinforcing effect is small.

The initial fiber length of wollastonite is, on the average, preferably not less than 20 μm, more preferably not less than 25 μm, especially preferably not less than 30 μm, but preferably not more than 400 μm, more preferably not more than 300 μm, especially preferably not more than 250 μm. When the average fiber length is less than 20 μm, the reinforcing effect is small, and when it exceeds 400 μm, the fibers are apt to break during working.

Further, the value obtained by dividing the initial average fiber length by the initial fiber diameter (initial average aspect ratio) is preferably not less than 4 but not more than 50, more preferably not less than 5 but not more than 40, especially preferably not less than 6 but not more than 30. When the average aspect ratio is less than 4, the reinforcing effect is small, and when this ratio exceeds 50, the fibers tend to break during working.

Regarding xonotlite which is an example of fibrous calcium silicate (C) used in the present invention, there have already been synthesized the preparations having an average fiber diameter of 0.5 to 1 μm, an average fiber length of 2 to 5 μm and an aspect ratio of about 2 to 15. In the present invention, it is preferable to use a preparation having the largest possible aspect ratio (not less than 6) as such a preparation has an excellent effect of improving mechanical properties and heat resistance (resistance to thermal deformation).

Talc (D) used in the present invention is pulverized and classified natural talc having a compositional formula of $3MgO.4SiO_2.H_2O$. The average grain size of talc (D) is not specifically defined, but it is usually not less than 0.5 μm, preferably not less than 1.0 μm, more preferably not less than 1.5 μm, usually not more than 20 μm, preferably not more than 15 μm, more preferably not more than 10 μm. When the average grain size of talc is less than 0.5 μm, its reinforcing effect is small and there is fear of causing large deformation or warpage of the product. When the grain size exceeds 20 μm, self-tapping properties of the product tend to deteriorate.

Mica (D) used in the present invention is a mineral of the aluminum silicate system. There are known various types of mica such as those represented by the following chemical formulae: $KAl_2(AlSi_3O_{10})(OH)_2$ (white mica), $K(Mg,Fe)_3(AlSi_3O_{10})(OH)_2$ (black mica), $KMg_3(AlSi_3O_{10})(OH)_2$ (gold mica), $KLi_2Al(Si_4O_{10})(OH)_2$ (flake mica), $NaAl_2(AlSi_3O_{10})(OH)_2$ (soda mica), and $KMg_3(AlSi_3O_{10})F_2$ (fluoro-gold mica), and all of these mica varieties have a tendency for cleavage. In the present invention, white mica and gold mica are preferred for the improvement of rigidity. In view of rigidity, improvement of warpage and self-tapping properties of the resin composition, mica (D) used in the present invention is of an average grain size of preferably not less than 3 μm, more preferably not less than 5 μm, especially preferably not less than 10 μm, but preferably not more than 200 μm, more preferably not more than 150 μm, especially preferably not more than 100 μm. When the average grain size of mica is less than 3 μm, the reinforcing effect is small and large deformation or warpage of the product may take place, and when mica has an average grain size in excess of 200 μm, self-tapping properties of the product tends to deteriorate.

Talc is preferred from the view of cost and mica is preferred from the view of rigidity.

Fibrous calcium silicate (C) and talc and/or mica (D) used in the present invention may have been surface treated with various types of coupling agent for the purpose of enhancing affinity for the amorphous thermoplastic resin (A) or interfacial bonding force. As the coupling agent, usually silane type, chromium type and titanium type are used. Preferred among them are the silane coupling agents, for example, epoxysilanes such as γ-glycidoxypropyltrimethoxysilane; vinyltrichlorosilane; and aminosilanes such as γ-aminopropyltriethoxysilane. In this case, it is preferable for the improvement of mechanical strength and kneading properties to conduct at the same time a treatment with various surfactants including nonionic, cationic and anionic types or dispersing agents such as fatty acids, metallic soap and various types of resins.

The reinforced thermoplastic resin composition according to the present invention contains at least an amorphous thermoplastic resin (A), a flame retardant (B), fibrous calcium silicate (C) and an inorganic material (D) comprising talc and/or mica, wherein the content of flame retardant (B) is 0.01 to 30 parts by weight based on 100 parts by weight of the amorphous thermoplastic resin (A), the content of fibrous calcium silicate in the composition is 3 to 30% by weight and the content of the inorganic material (D) comprising talc and/or mica in the composition is 3 to 30% by weight.

In the reinforced thermoplastic resin composition of the present invention, when the content of fibrous calcium silicate (C) is less than 3% by weight, self-tapping properties and rigidity of the product may fall short of the intended levels, and when the (C) content exceeds 30% by weight, there is a possibility that the product would become subject to a large warpage. Also, in the said composition, when the content of inorganic material (D) comprising talc and/or mica is less than 3% by weight, there is a possibility that the product would become subject to a large warpage, and when the (D) content exceeds 30% by weight, self-tapping strength of the product may lower.

The present invention has realized both reduction of warpage of the molded products and improvement of their self-tapping strength by containing in a base resin composition the specified amounts of components (C) and (D) which have the mutually contradictory effects, and as a consequence, made it possible to provide a reinforced thermoplastic resin composition having a good balance of properties.

The ratio by weight of fibrous calcium silicate (C)/inorganic material (D) comprising talc and/or mica is in the range from 1/10 to 10/1, preferably from 1/6 to 6/1, especially 1/4 to 4/1.

When the ratio of fibrous calcium silicate (C) is below the above-defined range, self-tapping properties and rigidity of the product deteriorate. Conversely, when the ratio of inorganic material (D) comprising talc and/or mica is below the above range, warpage of the product is stepped up.

The combined amount of amorphous thermoplastic resin (A) and flame retardant (B) accounts for preferably 50 to 90% by weight of the reinforced thermoplastic resin composition of the present invention. When the combined amount of (A) and (B) is less than 50% by weight, there is a tendency for fluidity of the composition to lower, and when this amount exceeds 90% by weight, the composition may lack required strength and rigidity.

The reinforced thermoplastic resin composition of the present invention may contain, in addition to the said components, an elastomer for enhancing impact strength within limits not prejudicial to the effect of the present invention. The elastomer used in the present invention is not designated; it is possible to use various known elastomers.

It is also possible to add where necessary stabilizers such as ultraviolet absorber and antioxidant, additives such as pigment, dye, lubricant, mold-release agent, antistatic agent, fluidity improver, etc., and reinforcing agents such as whiskers of potassium titanate, aluminum borate, etc., within limits not impairing the effect of the present invention.

For obtaining the thermoplastic resin composition of the present invention, the following methods, for instance, can be used: the said component materials are kneaded by various kneading machines such as single or multiple screw kneader, Banbury mixer, roll mixer, Brabender plastogram, etc., then cooling and solidifying the mixture; the said component materials are added to a proper solvent, for example, a hydrocarbon such as hexane, heptane, benzene, toluene or xylene or a derivative thereof, to form a solution in which the soluble components are mixed with each other or the soluble components and insoluble components are mixed in a suspended state. The melt kneading method is preferred in terms of industrial cost, but this method is not definitive.

In melt kneading, it is preferable to use a single- or twin-screw extruder, particularly a twin-screw extruder, and feed fibrous calcium silicate (C) at a point halfway of extrusion. This method enables stabilized production of the composition while preventing shattering of fibrous calcium silicate (C).

Various methods are available for obtaining the molded products from the reinforced thermoplastic resin composition of the present invention. It is possible, for instance, to apply the molding methods generally used for molding of the thermoplastic resin compositions, such as injection molding, blow molding, extrusion molding, sheet molding, hot molding, rotary molding and laminate molding. Injection molding is preferred for obtaining a molded product having a cylindrical boss as described later. Cylindrical boss is a useful joining means as it can be easily joined by directly driving a metal screw into the cylindrical boss. "Self-tapping properties" are a measure of structural strength observed when a metal screw is directly driven into the cylindrical boss, and it can be evaluated by the torque (breaking torque) at which the boss is broken when a metal screw is driven thereinto.

The reinforced thermoplastic resin composition of the present invention has excellent self-tapping properties, and its advantage can be put to good use more effectively when the composition is applied to the molding of the articles having such cylindrical bosses.

Breaking torque is variable depending on the type and configuration of the metal screw and the dimension of the boss, but in the case of the reinforced thermoplastic resin composition of the present invention, the breaking torque observed when, for instance, a B tightening screw with a nominal size of 4 mm in diameter and 8 mm in length was driven into a boss measuring 3.5 mm in inner diameter, 2.5 mm in wall thickness and 10 mm in height is preferably not less than 1.0 N·m, more preferably not less than 1.5 N·m.

The reinforced thermoplastic resin composition of the present invention and the molded products thereof can be obtained with stabilized quality since abrasion of the cylinder inner walls and screws of the melt kneader and molder and the gate and cavity of the mold used in the production and molding of the resin composition is minimized. Also, as the molded products of the said composition are small in warpage and excel in rigidity, strength, self-tapping properties, flame retardancy, etc., they can be ideally used as, for example, chassis for electric and electronic apparatus, OA equipment, etc.

EXAMPLES

The present invention will be described in further detail with reference to the examples thereof which are not intended to be limitative to the scope of the invention.

(A-1) Polycarbonate resin: poly-4,4-isopropylidenediphenyl carbonate, product of Mitsubishi Engineering-Plastics Corporation, under the trade name of Iupilon S-3000, viscosity-average molecular weight: 21,000 (hereinafter abbreviated as PC).

(A-2) Polyphenylene ether resin: poly(2,6-dimethyl-1,4-phenylene ether) (product of Mitsubishi Engineering-Plastics Corporation; intrinsic viscosity measured in 30° C. chloroform: 0.40 dl/g).

(A-3) AS resin: acrylonitrile-styrene copolymer, product of m Techno Polymer Co., Ltd. under the trade name of SAN-C (molecular weight: 150,000).

(A-4) ABS resin: acrylonitrile-butadiene-styrene copolymer, product of NIPPON A&L INC. under the trade name of SANTAC UT61.

(A-5) Polystyrene resin: polystyrene, product of PS Japan Co., Ltd. under the trade name of HF77 (molecular weight: 220,000).

(B-1) Phosphoric ester compound: resorcinol bis(diphenylphosphate), product of Daihachi Chemical Industry Co., Ltd. under the trade name of CR733S.

(B-2) Phosphoric ester compound: bisphenol A bis(diphenylphosphate), product of Daihachi Chemical Industry Co., Ltd. under the trade name of CR741. Fluorine resin: polytetrafluoroethylene, product of Daikin Industries, Ltd. under the trade name of Polyflon F-201L (molecular weight: 5,000,000).

(C) Fibrous calcium silicate: wollastonite having an average fiber diameter of 8 μm and an average fiber length of 136 μm (average aspect ratio: 17), product of Naiko Co., Ltd. under the trade name of Naigloss 8.

(D-1) Mica: white mica having an average grain size of 40 μm, product of Yamaguchi Mica CO., LTD. under the trade name of A-41.
(D-2) Mica: gold mica having an average-grain size of 30 μm, product of Kuraray Co., Ltd. under the trade name of 325HK.
(D-3) Talc: talc having an average grain size of 2 μm, product of Hayashi Kasei Co., Ltd. under the trade name of Micron White 5000S.

(Other Fillers Used for Comparison)

Glass flakes: those having an average grain size of 600 μm and a thickness of 2 to 6 μm, product of Nippon Sheet Glass Co., Ltd. under the trade name of REFG-101.

Glass fibers: 3 mm long chopped strands having a diameter of 13 μm.

EXAMPLES 1-8 AND COMPARATIVE EXAMPLES 1-8

The component materials other than fibrous calcium silicate, glass fibers and glass flakes were blended in the ratios shown in Table 1 to prepare the resin compositions, and each resin composition was uniformly mixed up by a tumbler mixer. Then, using a twin-screw extruder (30 mmφ) having two feed openings, the resin composition was supplied from the main hopper while feeding fibrous calcium silicate, glass fibers and glass flakes from a downstream hopper at a cylinder temperature of 280° C., and the mixture was pelletized.

The thus obtained pellets were injection molded by an injection molding machine (cycap M-2 with a clamping force of 75T, mfd. by Sumitomo Heavy Industries Ltd.) at a cylinder temperature of 280° C. and a mold temperature of 80° C. to make the ISO multipurpose test pieces. These test pieces were evaluated by the following methods. Results are shown in Table 1.

[Evaluation Methods]

(1) Flexural Modulus

The test pieces were subjected to a three-point bending test according to the ISO 178 bending test method.

(2) Flame Retardancy

Flammability at 1.5 mm thickness was tested according to the UL94 vertical flammability test.

(3) Self-Tapping Properties

The resin compositions were molded into the test pieces each having a cylindrical boss (boss size: 3.5 mm in inner diameter, 2.5 mm in wall thickness and 10 mm in height) by an injection molding machine (mfd. by Toshiba Machine Co., Ltd., clamping force: 150T) at a cylinder temperature of 280° C. and a mold temperature of 80° C. A "B" tightening screw having a nominal size of 4 mm in diameter and 8 mm in length was driven into the boss of each test piece, and the torque that caused breaking of the boss was measured and designated breaking torque.

(4) Warpage

The resin compositions were molded into the 150 mm×150 mm×20 mm high and 2 mm thick box-like test pieces by an injection molding machine (mfd. by Toshiba Machine Co., Ltd., clamping force: 150T) at a cylinder temperature of 280° C. and a mold temperature of 80° C. Warpage of the top portion of each box-like test piece was measured by a three-dimensional measuring machine mfd. by Mitsutoyo Corporation. Measurement was made at 15 points 10 mm away from each other along the center line of the top portion, and the maximum amount of fall from the reference line connecting both ends was expressed as warpage.

(5) Abrasion of Mold

The resin compositions were 10,000-shot molded into the test pieces each having a 2 mm-diameter pin erected in a runner by an injection molding machine (mfd. by Nissei Plastic Industrial Co., Ltd. at a cylinder temperature of 280° C. and a mold temperature of 40° C. The pins were made of NAK80 and designed exchangeable, and each pin was replaced with new one every time the material was changed. Then the diameter of each pin after 10,000 shot molding was measured by a three-dimensional measuring machine mfd. by Mitsutoyo Corporation, and the difference from the pin diameter measured before molding was determined and expressed as the amount of abrasion.

The smaller the difference of pin diameter before and after molding, the less the abrasion of the mold.

TABLE 1

|  |  | Example | | | |
| --- | --- | --- | --- | --- | --- |
|  | Unit | 1 | 2 | 3 | 4 |
| Composition | | | | | |
| (A-1)PC | parts by weight | — | — | — | — |
| (A-2)PPE | parts by weight | 50 | 60 | 50 | 60 |
| (A-3)AS | parts by weight | — | — | — | — |
| (A-4)ABS | parts by weight | — | — | — | — |
| (A-5)PS | parts by weight | 50 | 40 | 50 | 40 |
| (B) Phosphoric ester (Type) (Amount blended) | parts by weight | B-1 6 | B-2 8 | B-1 6 | B-2 8 |
| Fluorine resin | parts by weight | — | — | — | — |
| (C) Fibrous calcium silicate | wt % in the composition | 15 | 20 | 10 | 10 |
| (D) Mica and/or talc (Type) (Amount blended) | wt % in the composition | D-2 15 | D-2 10 | D-3 20 | D-2 10 |
| Glass flakes | wt % in the composition | — | — | — | — |
| Glass fiber | wt % in the composition | — | — | — | — |
| Properties | | | | | |
| Flexural modulus | MPa | 8,100 | 8,400 | 7,600 | 6,000 |
| Flame retardancy | — | V-1 | V-1 | V-1 | V-1 |
| Self-tapping Breaking torque | N·m | 1.6 | 1.8 | 1.5 | 1.7 |
| Warpage | μm | 500 | 560 | 430 | 490 |
| Mold abrasion | μm | ≦1.0 | ≦1.0 | ≦1.0 | ≦1.0 |

|  |  | Example | | | |
| --- | --- | --- | --- | --- | --- |
|  | Unit | 5 | 6 | 7 | 8 |
| Composition | | | | | |
| (A-1)PC | Parts by weight | — | 100 | 85 | 85 |
| (A-2)PPE | Parts by weight | 70 | — | — | — |
| (A-3)AS | Parts by weight | — | — | 15 | — |
| (A-4)ABS | Parts by weight | — | — | — | 15 |
| (A-5)PS | Parts by weight | 30 | — | — | — |
| (B) Phosphoric ester (Type) (Amount blended) | Parts by weight | B-1 14 | B-2 10 | B-1 12 | B-2 12 |
| Fluorine resin | Parts by weight | — | 0.2 | 0.2 | 0.2 |

TABLE 1-continued

| | Unit | | | | |
|---|---|---|---|---|---|
| (C) Fibrous calcium silicate | wt % in the composition | 15 | 20 | 10 | 10 |
| (D) Mica and/or talc (Type) (Amount blended) | wt % in the composition | D-2/D-3 7.5/7.5 | D-3 10 | D-1 15 | D-1/D-3 10/10 |
| Glass flakes | wt % in the composition | — | — | — | — |
| Glass fiber | wt % in the composition | — | — | — | — |
| Properties | | | | | |
| Flexural modulus | MPa | 8,000 | 8,300 | 8,200 | 8,000 |
| Flame retardancy | — | V-0 | V-0 | V-1 | V-1 |
| Self-tapping Breaking torque | N·m | 1.7 | 2.2 | 1.8 | 1.8 |
| Warpage | μm | 470 | 420 | 470 | 410 |
| Mold abrasion | μm | ≦1.0 | ≦1.0 | ≦1.0 | ≦1.0 |

TABLE 2

| | | Example | | | |
|---|---|---|---|---|---|
| | Unit | 1 | 2 | 3 | 4 |
| Composition | | | | | |
| (A-1)PC | parts by weight | — | — | — | — |
| (A-2)PPE | parts by weight | 50 | 60 | 50 | 70 |
| (A-3)AS | parts by weight | — | — | — | — |
| (A-4)ABS | parts by weight | — | — | — | — |
| (A-5)PS | parts by weight | 50 | 40 | 50 | 30 |
| (B) Phosphoric ester (Type) (Amount blended) | parts by weight | B-1 6 | B-2 8 | B-1 6 | B-2 14 |
| Fluorine resin | parts by weight | — | — | — | — |
| (C) Fibrous calcium silicate | wt % in the composition | 30 | — | — | — |
| (D) Mica and/or talc (Type) (Amount blended) | wt % in the composition | — | D-2 30 | D-3 30 | D-2/D-3 15/15 |
| Glass flakes | wt % in the composition | — | — | — | — |
| Glass fiber | wt % in the composition | — | — | — | — |
| Properties | | | | | |
| Flexural modulus | MPa | 8,500 | 7,900 | 7,400 | 7,700 |
| Flame retardancy | — | V-0 | V-0 | V-1 | V-0 |
| Self-tapping Breaking torque | N·m | 1.9 | 0.9 | 0.9 | 0.9 |
| Warpage | μm | 820 | 400 | 410 | 410 |
| Mold abrasion | μm | ≦1.0 | ≦1.0 | ≦1.0 | ≦1.0 |

TABLE 2-continued

| | | Example | | | |
|---|---|---|---|---|---|
| | Unit | 5 | 6 | 7 | 8 |
| Composition | | | | | |
| (A-1)PC | parts by weight | — | 100 | 85 | 85 |
| (A-2)PPE | parts by weight | 70 | — | — | — |
| (A-3)AS | parts by weight | — | — | 15 | — |
| (A-4)ABS | parts by weight | — | — | — | 15 |
| (A-5)PS | parts by weight | 30 | — | — | — |
| (B) Phosphoric ester (Type) (Amount blended) | parts by weight | B-1 14 | B-2 10 | B-2 12 | B-2 12 |
| Fluorine resin | parts by weight | — | 0.2 | 0.2 | 0.2 |
| (C) Fibrous calcium silicate | wt % in the composition | — | — | 15 | 2 |
| (D) Mica and/or talc (Type) (Amount blended) | wt % in the composition | — | D-3 10 | — | D-1 2 |
| Glass flakes | wt % in the composition | 15 | — | 15 | — |
| Glass fiber | wt % in the composition | 15 | — | — | — |
| Properties | | | | | |
| Flexural modulus | MPa | 8,000 | 8,400 | 8,000 | 2,900 |
| Flame retardancy | — | V-1 | V-0 | V-1 | V-1 |
| Self-tapping Breaking torque | N·m | 1.9 | 2.3 | 1.9 | 1.9 |
| Warpage | μm | 640 | 710 | 480 | 400 |
| Mold abrasion | μm | 3.0 | 4.0 | 3.0 | ≦1.0 |

What is claimed is:

1. A reinforced thermoplastic resin composition comprising at least an amorphous thermoplastic resin (A), a flame retardant (B), fibrous calcium silicate (C) and an inorganic material (D) which is a mixture of talc and mica, the content of flame retardant (B) being 0.01 to 30 parts by weight based on 100 parts by weight of the amorphous thermoplastic resin (A); the content of fibrous calcium silicate (C) in said composition being 3 to 30% by weight, and the content of the inorganic material (D) in said composition being 3 to 30% by weight.

* * * * *